F. ECAUBERT.
SKIMMING DEVICE FOR CREAM SEPARATORS.
APPLICATION FILED MAR. 15, 1909.

1,050,820.

Patented Jan. 21, 1913.

3 SHEETS—SHEET 1.

F. ECAUBERT.
SKIMMING DEVICE FOR CREAM SEPARATORS.
APPLICATION FILED MAR. 15, 1909.
1,050,820.
Patented Jan. 21, 1913.
3 SHEETS—SHEET 3.
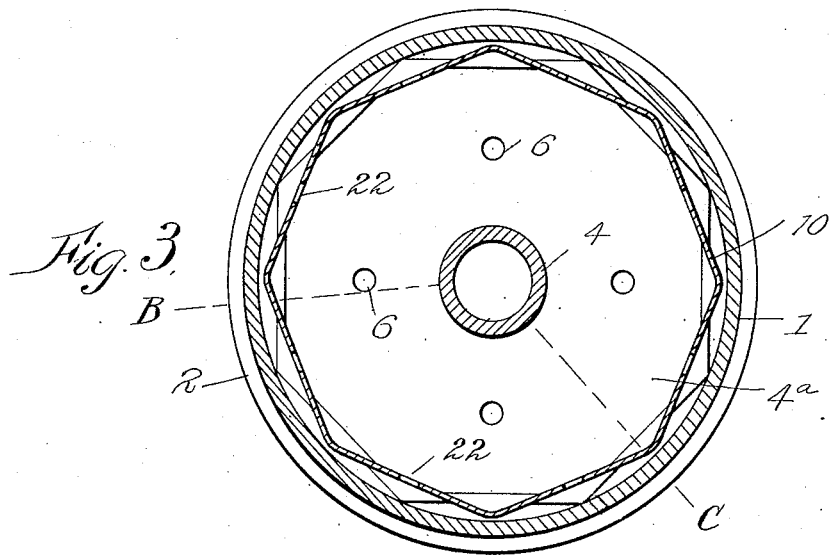
Fig. 3.
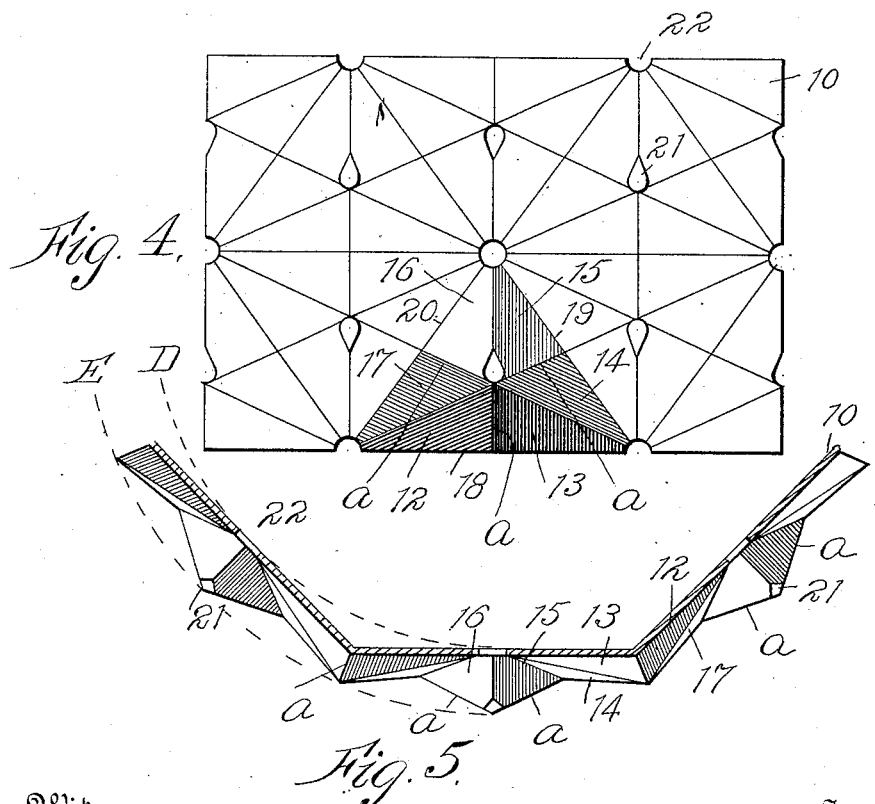
Fig. 4.
Fig. 5.
Witnesses:
Harold Knight
H H Knight
Inventor
Frederic Ecaubert
By his Attorneys

UNITED STATES PATENT OFFICE.

FREDERIC ECAUBERT, OF NEW YORK, N. Y.

SKIMMING DEVICE FOR CREAM-SEPARATORS.

1,050,820.  Specification of Letters Patent.  Patented Jan. 21, 1913.

Application filed March 15, 1909. Serial No. 483,539.

*To all whom it may concern:*

Be it known that I, FREDERIC ECAUBERT, a citizen of the United States, residing in the borough of Brooklyn, city of New York, in the county of Kings and State of New York, have invented certain new and useful Improvements in Skimming Devices for Cream-Separators, of which the following is a specification.

My invention relates to the perforated screens or cylinders having corrugated or irregular surfaces used in connection with the rapidly revolving retainers or bowls of centrifugal cream separators by the use of which the separating process is accelerated, and a line of positive demarcation created and maintained between the cream and blue milk as each approaches the discharge region, and, more particularly to the conformation of the surfaces comprised in the corrugations and their relation to the perforations through which the cream and milk pass in opposite directions during the separating process.

The object of this invention is to effect a complete separation of the cream from the new milk, to separate a larger output of cream from a given quantity of milk within a limited period of time, to effect a larger separating capacity in connection with a bowl or retainer of comparatively small dimensions; thus affording a great saving in time and power, and to provide a device which may be easily, quickly and thoroughly cleansed.

The invention consists essentially in the skimming element or annular partition contained within the bowl or retainer of a cream separator, and in the conformation of its surfaces, the arrangement and combination of parts in relation to the same, all substantially as will be hereinafter set forth and particularly claimed.

Referring to the accompanying drawings, in which so much of a cream separator is shown as is necessary for the illustration of my device, like letters of reference indicate corresponding parts in each of the several views or figures.

Figure 1:
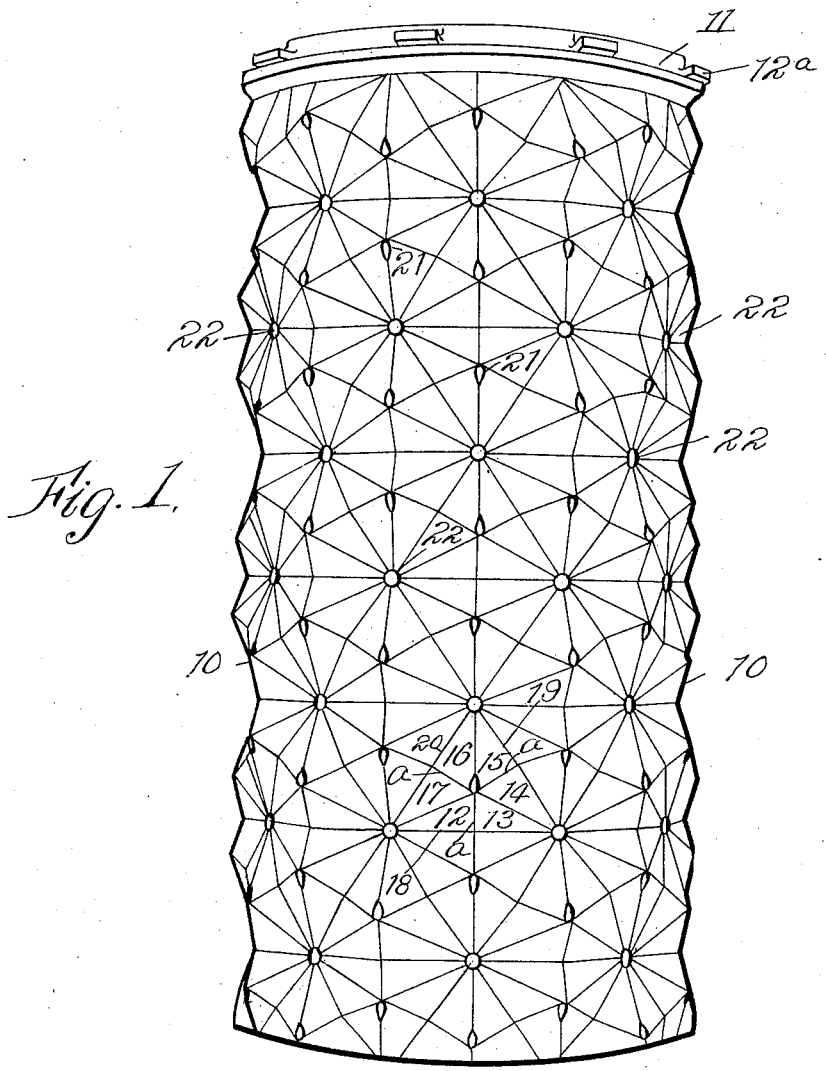
Figure 2:
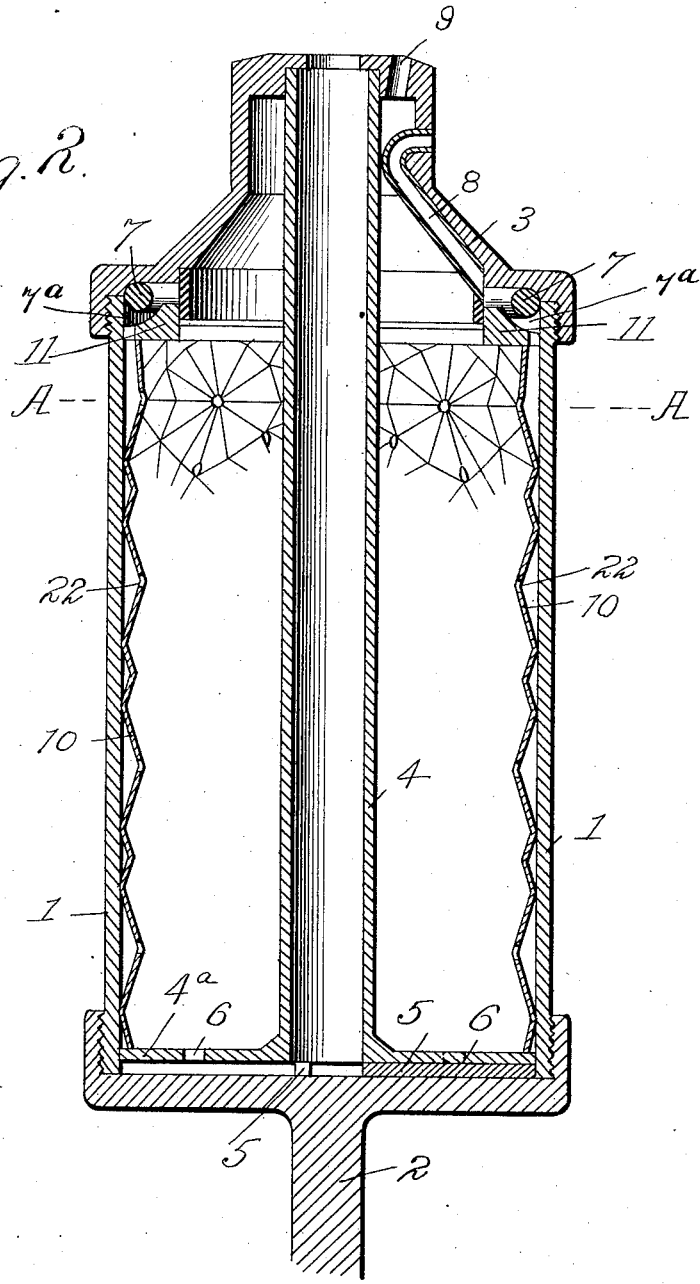

Figure 1 is a perspective view of my skimming device showing the development and arrangement of its peculiar deflecting surfaces. Fig. 2 shows an axial or vertical section of my device in position within the bowl or retainer of a cream separator, also in section and illustrating in part the interior or reverse configurations of those displayed in Fig. 1. Fig. 3 shows a sectional view of my device as above in a horizontal plane as indicated by the line A—A, Fig. 2. Fig. 4 shows the development of the corrugations in a plane and comprises an enlarged part of the exterior surface of my device as shown in Fig. 1. Fig. 5 shows an enlarged section of the walls of my device on the line A, A Fig. 2 and as an arc intermediate radial lines B, C, Fig. 3.

In the drawings, see Fig. 2, 1 indicates an ordinary bowl or retainer of a cream separator mounted axially on the shaft 2 by which it is supported and rapidly rotated by means of any well known device. This retainer is provided with the cover 3 from which the axial feed tube 4 extends to the bottom portion where it terminates in the flange 4$^a$ which is held slightly above the bottom by the radial lugs 5 which are preferably attached to said flange. Openings 6 are provided in the flange 4$^a$ for the flow of the milk. A packing ring 7 serves as a seal for the cover 3. A blue milk exit is provided by the duct 8 which leads from the annular channel 7$^a$ and a cream exit in the opening 9 in the cover 3, their arrangement being so that they will discharge in separate annular collecting recesses usually provided for that purpose from which discharge spouts lead to proper receiving receptacles (not shown). Within the retainer 1 and positioned concentrically in proximity to its interior cylindrical wall is the corrugated and perforated skimming device 10. This device is separately shown in Fig. 1. It is provided with the annular centering and driving means 11, consisting of a ring or collar and the radial lugs 12$^a$ which are of such length as to fit within the diameter of the retainer, and, while providing an intermediate space between the skimming device and the wall of the retainer for the passage of the blue milk, also serve to keep the same properly centered. In Fig. 1 the skimming device 10 is shown in perspective. It consists of a thin metallic tubular body of a less diameter than the retainer 1 in which it is to be used. The walls of this tube are corrugated or embossed by means of proper dies to convert the surface into a series of corrugations or protuberances arranged geometrically over the entire surface as associated pyramids, which, in their relative arrangement and conformation chiefly constitute the novel features of my device. These pyramidal corrugations or protuberances are shown obversely, in part only, in Fig. 2. The entire interior and exterior surface of the device is produced by a geometrically arranged repetition of allied pyramids each of which constitutes a geometrical unit. This unit consists primarily of a pyramidal protuberance or boss; or, preferably of such a protuberance in the form of a hexagonal pyramid with its apex extending exteriorly and with its base reduced in plan to a triangle of such dimensions as may be inscribed within the normal base of such pyramid. It is not essential that these pyramids shall be regular, their axes may be eccentric of their bases without departing from my method of arrangement or their usefulness. As shown in Figs. 1 and 4 these pyramids are assembled on their triangular bases and adjoining each other in a geometrical arrangement throughout the whole surface of my device. In Fig. 4; 12, 13, 14, 15, 16 and 17 indicate the angular planes forming the surface of the preferred hexagonal pyramid having its apex at 21 and its base within a triangular area bounded by the lines 18, 19 and 20. The planes 12 and 13, 14 and 15, 16 and 17 are in the same angular relation to each other as if the pyramid was in fact hexagonal at its base, therefore the lines 18, 19 and 20 which circumscribe the triangular base of the pyramid cut it in planes parallel or exteriorly parallel with its axis, and intersecting at a point above its normal base the edges $a$ of the pyramid which lie intermediate the planes 12 and 13, 14 and 15, and 16 and 17. The general assembly of these pyramids as geometrical units may be viewed as a series of horizontal zones with each alternate triangle inverted, or as a pair of adjoining triangles as a subordinate unit having as its base a rhomboidal figure, such units combining with each other geometrically to form a series of right and left helical bands about the cylinder. This arrangement of pyramids having triangular bases in horizontal zones with each alternate triangle inverted brings their apices in different horizontal planes, likewise the perforations 21, thus doubling their effective field. It will be readily understood that the interior of this device will show a corresponding reverse condition of the exterior owing to its construction with comparatively thin walls. This corrugated cylinder is provided with two sets of perforations which lie in different coaxial cylindrical surfaces which are represented in Fig. 5 by dotted lines D, E. Adjacent to the apex of each pyramid is a perforation 21 which as it lies at a greater distance from the axis of the cylinder and its retainer provides for the passage of the heavier element or blue milk. At the intersection of all lines comprising the triangular boundaries of adjoining pyramids are perforations 22 for the passage inwardly of the lighter element or of such cream particles as may chance to go beyond the wall of this device. In developing the surfaces of my device by these associated pyramids arranged in the manner described, I have secured gathering and deflecting areas which are at all times in a plane which are either angularly disposed in relation to the lines of centrifugal action or tangential to rotary action, and at the same time directive in deflecting effect toward a perforation through which the lighter or heavier elements of the material to be acted upon should normally pass. This is effected by the fact that all these surfaces are planes which in all instances extend from a perforation in a field of major centrifugal pressure to a perforation in a field of minor centrifugal pressure, the arrangement being such that there is an utter absence of intermediate depressions or pockets which would be likely to retard the free flow of the elements definitely toward the proper perforations. In the assembly of these units definite, trough-like conduits are formed intermediate the same, and as these are bisected by the pyramidal edges $a$ shown between the planes 12 and 13, 14 and 15, 16 and 17 at an elevation from the base of these pyramids, these conduits direct the flow freely and in all instances toward the perforations 22 from which they radiate. The arrangement of these gathering and deflecting surfaces and conduits intermediate the two sets of perforations is such that no part of the wall of the device lies in a cylindrical surface intermediate such perforations, the intermediate surface being in all instances broken by an intervening angle so that there will be no tendency of the fluid elements to wipe by any perforation and by so doing create eddies to and fro through such perforations and interfere with positive separating action.

My device may be used in connection with any well known cream separator or centrifugal machine and its operation is as follows: New milk is fed by a flow regulating device (not shown) downward through the axial tube 4. It passes between the bottom of the retainer 1 and the flange 4ª and thence upwardly through the perforations 6 into the body of the retainer. Here the separating action is set up by centrifugal force which carries the blue milk outwardly through the perforations 21 to the space intermediate the skimming device 10 and the inner wall of the retainer 1. Any cream particles which may pass out with it will be intercepted by the pyramidal protuberances or corrugations and agglomerated thereon and will flow inwardly through the perforations 22 and thence in proximity to the tube 4 and with the mass of cream rise and be discharged through the opening 9 in the cover. Thus the blue milk in rising between the wall of the retainer and the exterior of my device will be thoroughly divested of cream and rising through the tube or tubes 8 be discharged as hereinbefore described.

Having thus described the invention, what I claim as new is—

1. In a centrifugal fluid separator, a skimming partition comprising a perforated cylindrical screen the wall of which is corrugated in a series of hexagonal pyramids.

2. In a centrifugal fluid separator, a skimming partition comprising a perforated cylindrical screen the wall of which is corrugated in a series of associated hexagonal pyramids having certain of the perforations adjacent the apices of said pyramids and others intermediate their bases.

3. In a centrifugal fluid separator, a perforated skimming partition therefor bearing gathering protuberances, said protuberances having the form of exteriorly projecting hexagonal pyramids.

4. In a centrifugal fluid separator, a skimming partition comprising a perforated cylindrical screen the wall of which is corrugated into a series of associated hexagonal pyramids, said pyramids having the plan of their bases reduced to a triangle inscribed within the normal bases of said hexagonal pyramids.

5. In a centrifugal fluid separator, a skimming partition comprising a perforated cylindrical screen the wall of which is corrugated into a series of associated hexagonal pyramids, said pyramids having the plan of their bases reduced to a triangle inscribed within the normal bases of said hexagonal pyramids such pyramids being geometrically assembled along the lines of said triangular bases.

6. In a centrifugal fluid separator, a skimming partition comprising a cylindrical screen, bearing perforations in different coaxial cylindrical surfaces the wall of which is corrugated into a series of geometrically associated hexagonal pyramids having triangular bases, one set of said perforations lying intermediate said pyramids and at the intersection of the triangular lines within which the bases of said pyramids are inscribed.

7. In a centrifugal fluid separator, a skimming partition comprising a cylindrical screen, bearing perforations in different coaxial cylindrical surfaces having a series of inclined plane surfaces intermediate said perforations, each set of said plane surfaces combining to produce a hexagonal pyramid about an axis adjacent to its corresponding perforation.

8. In a centrifugal fluid separator, a skimming partition comprising a cylindrical screen bearing perforations in different coaxial surfaces having the inclined plane surfaces of hexagonal pyramids intermediate said perforations, said inclined plane surfaces combining to form inclined conduits terminating in one set of said perforations.

9. In a centrifugal fluid separator, a skimming partition comprising a perforated cylindrical screen the wall of which is corrugated into a series of associated inclined planes for gathering and deflecting the elements toward their proper perforations, said planes combining to produce exteriorly projecting hexagonal pyramids.

10. In a centrifugal fluid separator, a skimming partition comprising a cylindrical screen bearing perforations in two coaxial surfaces the wall of which is corrugated into a series of hexagonal pyramids having triangular bases and the exterior set of said perforations adjacent their apices, said pyramids being geometrically assembled in circumferential bands to bring said exterior perforations comprised within said bands in different horizontal planes.

FREDERIC ECAUBERT.

Witnesses:
LAURA E. MONK,
HARRY E. KNIGHT.

---

Copies of this patent may be obtained for five cents each, by addressing the "Commissioner of Patents, Washington, D. C."